(12) United States Patent
Park et al.

(10) Patent No.: US 7,345,820 B2
(45) Date of Patent: Mar. 18, 2008

(54) OPTICAL PICK-UP APPARATUS

(75) Inventors: Soo Han Park, Yongin-Si (KR); Seong Su Park, Suwon-Si (KR); Jung Woo Hong, Suwon-Si (KR); Bong Gi Kim, Suwon-Si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 283 days.

(21) Appl. No.: 11/111,988

(22) Filed: Apr. 22, 2005

(65) Prior Publication Data

US 2006/0098259 A1    May 11, 2006

(30) Foreign Application Priority Data

Nov. 11, 2004  (KR) .................. 10-2004-0091834

(51) Int. Cl.
*G02B 5/18* (2006.01)
*G11B 7/00* (2006.01)
*G11B 7/135* (2006.01)

(52) U.S. Cl. .............. 359/569; 369/112.07; 369/112.18

(58) Field of Classification Search ............... 359/565, 359/566, 569; 369/112.06, 112.07, 112.11, 369/112.12, 112.18, 112.19
See application file for complete search history.

(56) References Cited

U.S. PATENT DOCUMENTS

| | | | |
|---|---|---|---|
| 4,983,017 A * | 1/1991 | Tsuji et al. ............... 359/566 |
| 5,856,961 A * | 1/1999 | Brazas et al. ............ 369/44.23 |
| 6,636,464 B1 * | 10/2003 | Lee et al. ................ 369/44.23 |
| 2002/0159378 A1 * | 10/2002 | Lee et al. .............. 369/112.12 |
| 2003/0095334 A1 | 5/2003 | Kim et al. |
| 2003/0185133 A1 | 10/2003 | Kaiho et al. |
| 2004/0120229 A1 | 6/2004 | Pae et al. |
| 2004/0170106 A1 | 9/2004 | Komma |
| 2005/0226122 A1 | 10/2005 | Ooi et al. |

FOREIGN PATENT DOCUMENTS

| | | |
|---|---|---|
| CN | 1278096 A | 12/2000 |
| EP | 1 096 483 | 5/2001 |
| EP | 1 130 581 | 9/2001 |
| EP | 1 617 424 | 1/2006 |
| JP | 2003-173563 | 6/2003 |
| JP | 2004-281008 | 10/2004 |
| KR | 1999-22917 | 1/2001 |
| KR | 2002-34646 | 12/2003 |

* cited by examiner

*Primary Examiner*—Alessandro Amari
(74) *Attorney, Agent, or Firm*—Roylance, Abrams, Berdo & Goodman, LLP

(57) ABSTRACT

A compatible optical pick-up apparatus, which records to and/or reproduce from both digital versatile disc (DVD)-type optical disks and compact disc (CD)-type optical disks for improving a signal regeneration capacity and a tracking capacity in operation at a high temperature. A polarized hologram of the optical pick-up apparatus is divided into six diffraction regions. The rays of a first light diffracted at the first and second diffraction regions are separately received by divided parts of a first bisected light-receiving portion of a photodetector.

10 Claims, 5 Drawing Sheets

(a)

(b)

OPTICAL PICK-UP APPARATUS

CROSS-REFERENCE TO RELATED APPLICATION

This application claims the benefit under 35 U.S.C. § 119(a) of Korean Patent Application No. 2004-91834, filed Nov. 11, 2004, in the Korean Intellectual Property Office, the entire disclosure of which is hereby incorporated by reference.

BACKGROUND OF THE INVENTION

1. Field of the Invention

The present invention relates to an optical pick-up apparatus. More particularly, the present invention relates to a hologram element used in a compatible optical pick-up apparatus for recording data to and/or reproducing data from both digital versatile disc (DVD)-type optical disks and compact disc (CD)-type optical disks.

2. Description of the Related Art

Generally, optical disks are used as storage media for recording and/or reproducing data, such as audio, images and text, by varying the reflection of a laser beam through a plurality of pits formed on the surfaces thereof. The optical disks have a high storage capacity, and are handy to carry, thereby being substituted for conventional storage media such as floppy disks.

Korean Patent Laid-open Publication No. 2003-0097328, which is assigned to the assignee of the instant application and the entire contents of which are hereby incorporated by reference, discloses a conventional optical pick-up apparatus for recording and/or reading optical disks. The optical pick-up apparatus disclosed by the above patent records data to and/or reproduces data from optical disks, such as DVD-RAM/RW/R and CD-RW/R.

The above described optical pick-up apparatus includes a polarized hologram for diffracting light, reflected by the optical disk, into zero-order and positive and negative first-order rays before the beam forms an image onto a photodetector. The polarized hologram diffracts only linear polarized rays in a designated direction. That is, the polarized hologram linearly transmits a P-polarized ray, and diffracts an S-polarized ray. The polarized hologram is divided into five diffraction regions, and serves to split the light forming the image onto the photodetector.

The photodetector includes a plurality of light-receiving portions for generating signals from the beams split by the polarized hologram. The signals detected by the respective light-receiving portions are selectively used to generate a servo control signal and a reproduction signal.

When an optical disk player set including the above optical pick-up apparatus is operated to record data to and/or reproduce data from an optical disk, the optical disk player set reaches a comparatively high temperature due to heat generated from a chip or motor installed therein. Although a cooling fan for exhausting the heat is installed in the set, it is difficult to prevent the temperature from increasing in the optical disk set. Particularly, the high power of a laser beam increases the temperature of the set to 60° C. in a DVD recording mode.

Optical components constituting the optical pick-up apparatus are warped or distorted by the heat deformation when operating at such a high temperature. The warpage or the distortion of the optical components changes the optical path, thereby deviating the light received by the photodetector from a designated position, or distorting an image of the light to deteriorate a signal reproducing capacity. Particularly, it generates an error in detecting a signal for a tracking the servo, thereby increasing the possibility of tracking errors. Hereinafter, with reference to the above Laid-open Patent, the tracking errors will be described in more detail.

Using a push-pull method, a tracking error signal is detected by the difference between a first push-pull signal regarding a detecting signal of second to fifth single signal light-receiving portions and a second push-pull signal regarding a detecting signal of a first quartered light-receiving portion. When the optical pick-up apparatus is operated at a high temperature, images formed on the respective light-receiving portions are deformed. When the images formed on the second to fifth single light-receiving portion are deformed, the amount of the overall light is not changed. However, when the image formed on the first quartered light-receiving portion is deformed, the balance of the optical power in divided regions of the first quartered light-receiving portion is disturbed. Consequently, the second push-pull signal regarding the detecting signal of the first quartered light-receiving portion is changed, thereby generating errors in the tracking error signal.

SUMMARY OF THE INVENTION

Therefore, one aspect of embodiments of the present invention is to provide an optical pick-up apparatus, which improves a signal reproduction capacity and a tracking capacity in operation at a high temperature.

In accordance with one aspect, the present invention provides an optical pick-up apparatus comprising a light source; an objective lens for focusing light emitted from the light source into an optical disk; a hologram for splitting the light reflected by the optical disk, and diffracting rays split from the light; and a photodetector for detecting a regeneration signal and a servo signal from the reflected rays split by the hologram, wherein the hologram comprises first and second diffraction regions extended in the tangential direction of the optical disk, and third to sixth diffraction regions formed at both sides of the first and second diffraction regions in the radial direction of the optical disk.

Preferably, the photodetector can comprise a first bisected light-receiving portion for receiving negative first-order rays diffracted at the first and second diffraction regions, a first single light-receiving portion for receiving positive first-order rays diffracted at the first and second diffraction regions, third to sixth single light-receiving portions for respectively receiving negative first-order rays diffracted at the third to sixth diffraction regions, and third to sixth bisected light-receiving portions for respectively receiving positive first-order rays diffracted at the third to sixth diffraction regions.

Further, preferably, the negative first-order rays diffracted at the first and second diffraction regions can respectively form images at divided parts of the first bisected light-receiving portion.

Moreover, the hologram can be a polarized hologram for diffracting a designated linear polarized ray, and a quarter-wave plate can be provided between the hologram and the optical disk.

In accordance with another aspect, embodiments of the present invention provide an optical pick-up apparatus comprising a light source for emitting a first light to record data to and/or reproduce data from a DVD-type optical disk; a hologram optical module for emitting a second light to record and/or reproduce a CD-type optical disk; an objective lens for focusing the first and second lights into an optical disk; a hologram element provided with a polarized hologram for splitting and diffracting the first light reflected by the optical disk; and a photodetector for receiving the first light split by the hologram element and detecting a regeneration signal and a servo signal, wherein the polarized hologram includes first and second diffraction regions extended in parallel in the tangential direction of the optical disk, and third to sixth diffraction regions formed at both sides of the first and second diffraction regions.

BRIEF DESCRIPTION OF THE DRAWINGS

These and/or other aspects and advantages of embodiments of the present invention will become apparent and more readily appreciated from the following description of the embodiments, taken in conjunction with the accompanying drawings in which.

Throughout the drawings, it should be understood that like reference numbers refer to like features, structures, and elements.

DETAILED DESCRIPTION OF EXEMPLARY EMBODIMENTS

An embodiment of the present invention will now be described in more detail with reference to the annexed drawings.

Figure 1:
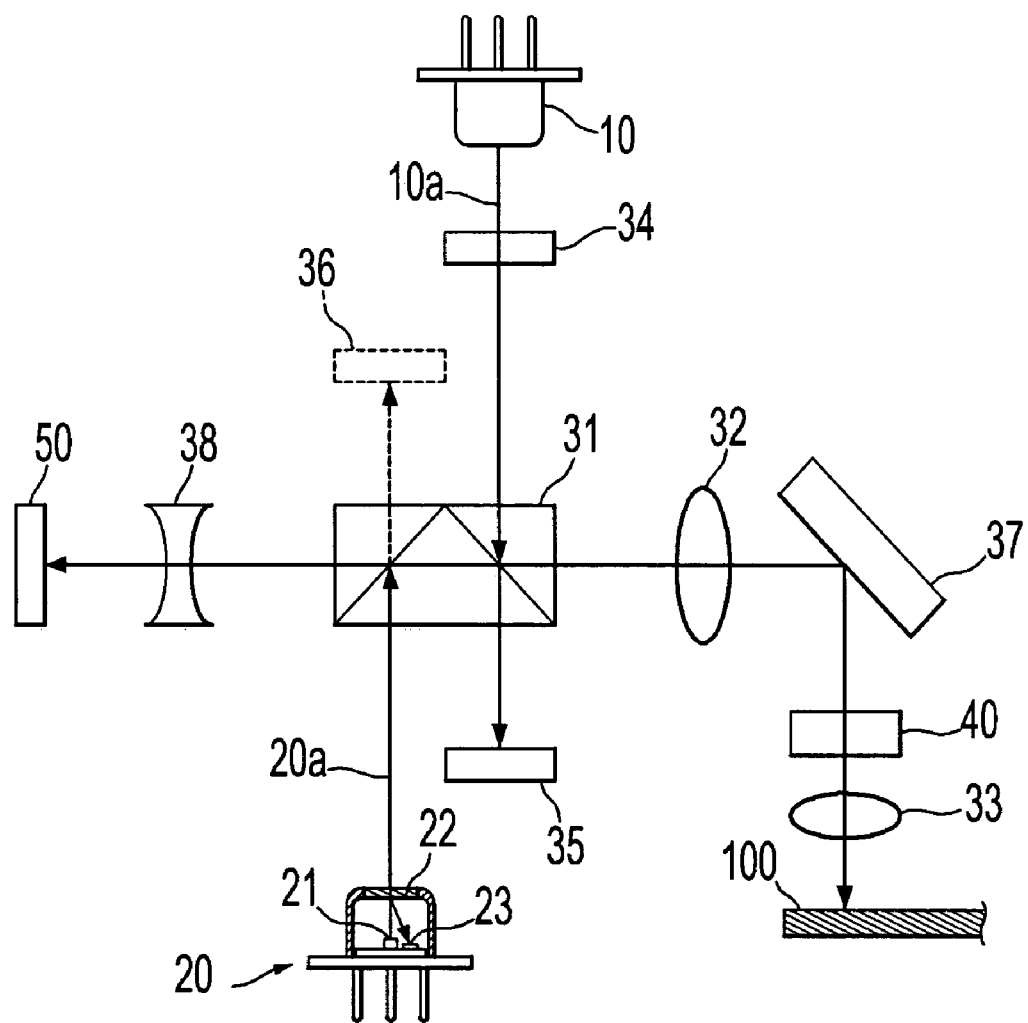
FIG. 1 is a schematic view illustrating an optical structure of an optical pick-up apparatus in accordance with an embodiment of the present invention.

As shown in FIG. 1, an optical pick-up apparatus in accordance with an embodiment of the present invention comprises a light source 10 for emitting a light 10a (hereinafter, referred to as "the first light") to record data to and/or reproduce data from a DVD-type optical disk, a hologram optical module 20 for emitting a light 20a (hereinafter, referred to as "the second light") to record data to and/or reproduce data from a CD-type optical disk, an optical splitter 31 for converting the optical paths of the emitted first and second lights 10a and 20a, a collimating lens 32 for converting the first and second lights 10a and 20a, the optical paths of which are converted into parallel lights, an objective lens 33 for focusing the parallel lights into an optical disk 100, a hologram element 40 installed between the collimating lens 32 and the objective lens 33, a photodetector 50 for detecting a signal from the light reflected by the optical disk 100, and a sensor lens 38 for increasing the size of an image of the light received by the photodetector 50 and eliminating astigmatism.

The light source 10 is made of a laser diode (LD) for emitting light having a wavelength of approximately 650 nm for DVDs. The light source 10 emits a linear polarized ray in a designated direction. In this embodiment, the light source 10 emits an S-polarized ray. A half-wave plate 34 is located in front of the light source 10. The S-polarized ray emitted from the light source 10 passes through the half-wave plate 34, thereby being converted into a P-polarized ray orthogonal thereto.

The hologram optical module 20 is a package including a light source 21, a photodetector 23, and a hologram 22. Here, a general module is used as the hologram optical module 20. The light source 21 of the hologram optical module 20 is a laser diode for emitting light having a wavelength of approximately 780 nm for CDs. Since the light source 21 and the photodetector 23, which are separated from each other by a designated interval, are fixed in the hologram optical module 20, the hologram optical module 20 is advantageous in that the optical axes of two components are simultaneously set by performing an adjusting-operation only once.

The first light 10a emitted from the light source 10 and the second light 20a emitted from the hologram optical module 20 are reflected by the optical splitter 31, and turned towards the collimating lens 32. A part of the first light 10a is not reflected by the optical splitter 31, but is transmitted by the optical splitter 31. The transmitted part of the first light 10a is received by a first front photodetector 35 located at the opposite side of the light source 10 with respect to the optical splitter 31. The first front photodetector 35 detects a signal varied according to the intensity of the first light 10a emitted from the light source 10, and the signal is used as feedback to control the current input to the light source 10. Further, a second front photodetector 36 is located at the opposite side of the hologram optical module 20. The second front photodetector 36 detects a part of the second light 20a transmitted by the optical splitter 31, and the light source 21 installed in the hologram optical module 20 is feedback-controlled by a signal detected by the second front photodetector 36.

The collimating lens 32 converts the emitted first and second lights 10a and 20a into light beams having parallel paths. The parallel light beams emitted from the collimating lens 32 are reflected by a reflecting mirror 37 located in front of the collimating lens 32, and are turned towards the hologram element 40. The reflecting mirror 37 can be used, if necessary.

Figure 2:
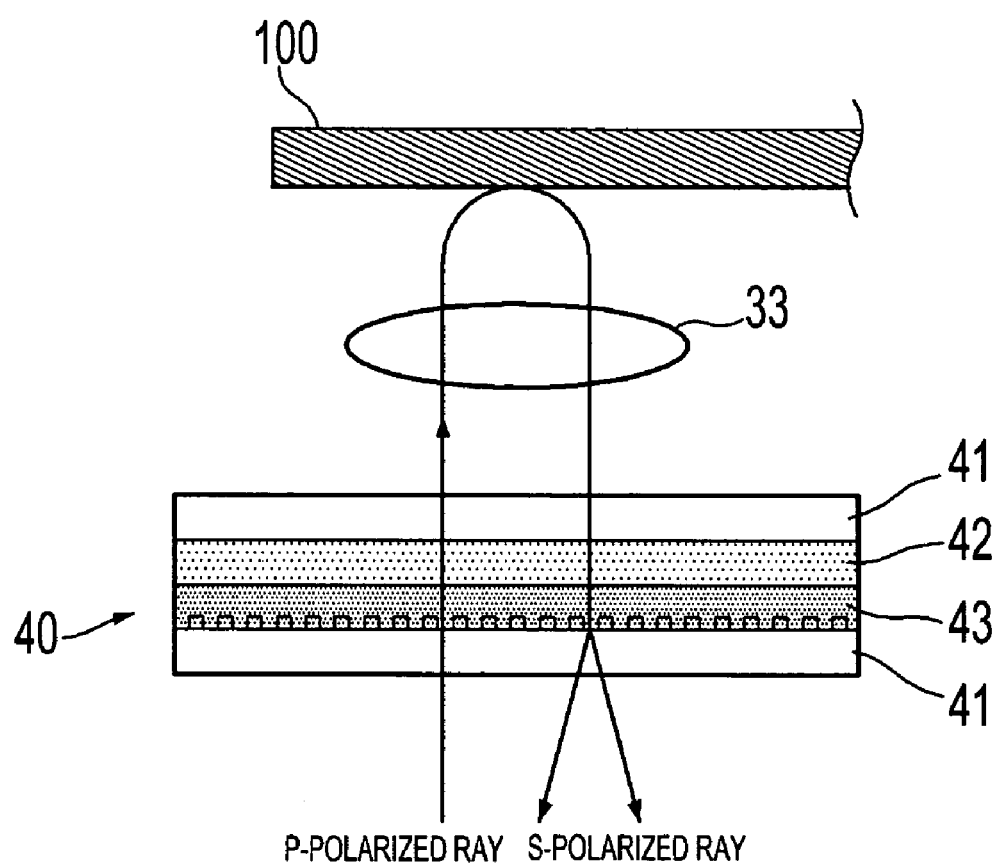
FIG. 2 is a schematic view illustrating a hologram element of the optical pick-up apparatus of FIG. 1 and diffraction thereof.

As shown in FIG. 2, the hologram element 40 has a structure such that a quarter-wave plate 42 and a layer of a polarized hologram 43 are interposed between two glass layers 41. Preferably, the quarter-wave plate 42 is designed to serve as a quarter-wave plate only to the wavelength of the first light 10a. Further, preferably, the polarized hologram 43 is designed to selectively diffract light according to the wavelength and polarized direction of the transmitted light. That is, the polarized hologram 43 serves to diffract only the wavelength of the first light 10a, but not to diffract the wavelength of the second light 20a. More specifically, the polarized hologram 43 diffracts only the S-polarized ray out of the first light 10a, and linearly transmits the P-polarized ray out of the first light 10a. On the other hand, the polarized hologram 43 may be designed to diffract the P-polarized ray out of the first light 10a. However, in this case, the transmission efficiency of the hologram element 40 is decreased. Accordingly, the polarized hologram 43 is preferably designed to diffract the S-polarized ray.

The first light 10a, which generates the S-polarized ray, emitted from the light source 10 is converted into the P-polarized ray by the half-wave plate 34, and the P-polarized ray sequentially passes through the layer of the polarized hologram 43 and the quarter-wave plate 42, and is condensed onto the optical disk 100 by the objective lens 33.

Here, the incident P-polarized ray is linearly transmitted by the polarized hologram 43, and passes through the quarter-wave plate 42, thereby being converted into a circular polarized ray. The circular polarized ray is reflected by the optical disk 100, and the direction thereof is converted. Then, the circular polarized ray passes through the quarter-wave plate 42 again, thereby being converted into S-polarized ray. The S-polarized ray, which is converted from the reflected light, is split by the polarized hologram 43, thereby being diffracted into a zero-order ray and positive and negative first-order rays. The first light 10a split by the hologram element 40 passes through the collimating lens 32, is transmitted by the optical splitter 31, and is then received by the photodetector 50.

The second light 20a, reflected by the optical disk 100, is transmitted by the hologram element 40 without diffraction, passes through the collimating lens 32, is reflected by the optical splitter 31 towards the hologram optical module 20, is diffracted by the hologram 22 on the hologram optical module 20, and is detected by the photodetector 23.

Figure 3:
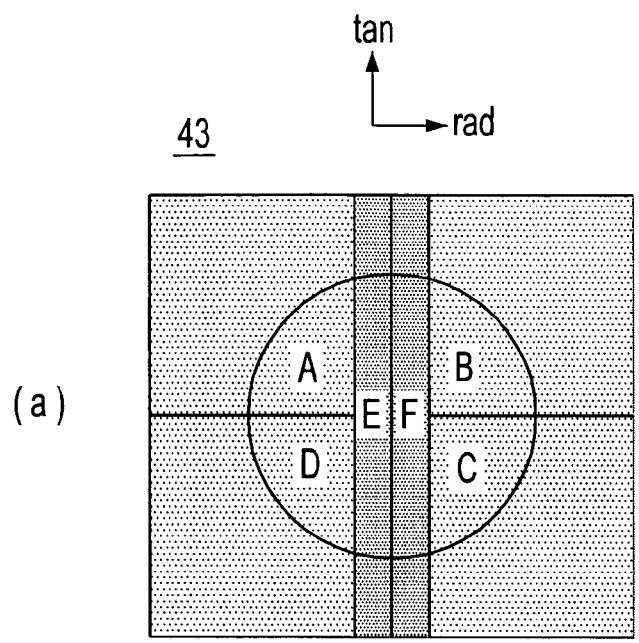
FIG. 3A is a plan view illustrating diffraction regions of a polarized hologram of the hologram element of FIG. 2.
FIG. 3B is a schematic view illustrating a substantial shape of the polarized hologram of FIG. 3A.
Figure 3:
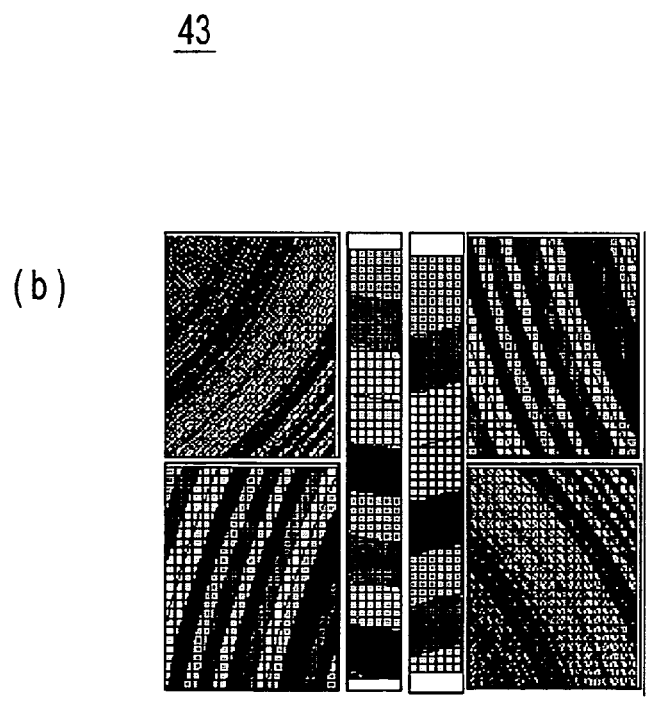

FIG. 3A illustrates the shape of the polarized hologram 43, which is seen towards the optical disk 100. The polarized hologram 43 is divided into six diffraction regions E, F, A, B, C, and D. That is, the six diffraction regions consist of a first diffraction region E and a second diffraction region F, which are extended in parallel in the tangential direction of the optical disk 100, and third to sixth diffraction regions A, B, C, and D aligned at both sides of the first and second diffraction regions E and F in the radial direction of the optical disk 100. The diffraction regions E, F, A, B, C, and D split the first light 10a reflected by the optical disk 100, and diffract the split rays of the first light 10a in different directions. The more substantial shapes of the diffraction regions E, F, A, B, C, and D are illustrated in FIG. 3B.

Figure 4:
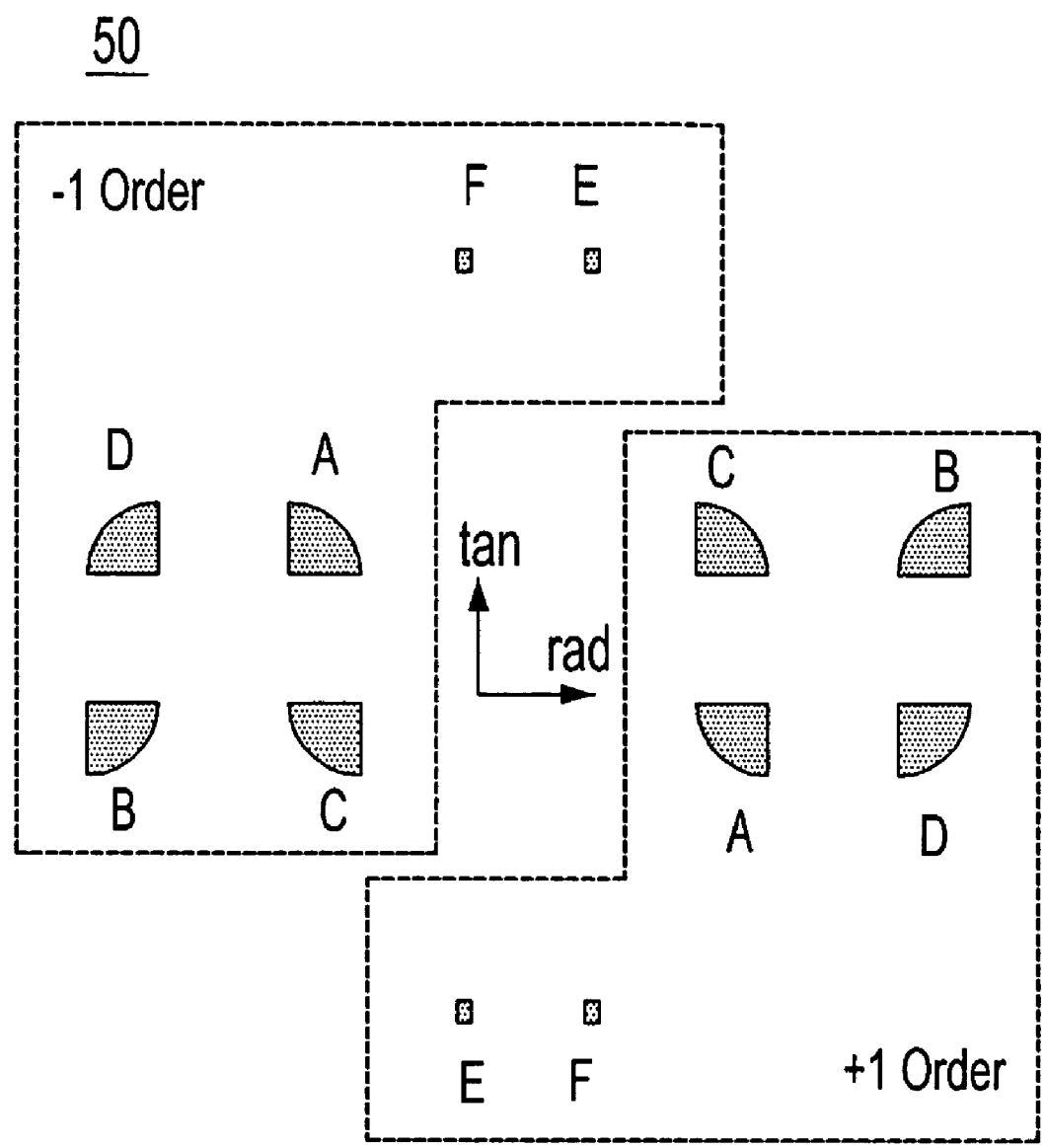
FIG. 4 is a schematic view illustrating shapes of beams received by a photodetector of the optical pick-up apparatus of FIG. 1.

FIG. 4 illustrates the images of the rays of the first light 10a, which are split by the hologram element 40, received by the photodetector 50. The negative first-order ray is received by upper and left parts of the photodetector 50, and the positive first-order ray is received by lower and right parts of the photodetector 50.

Figure 5:
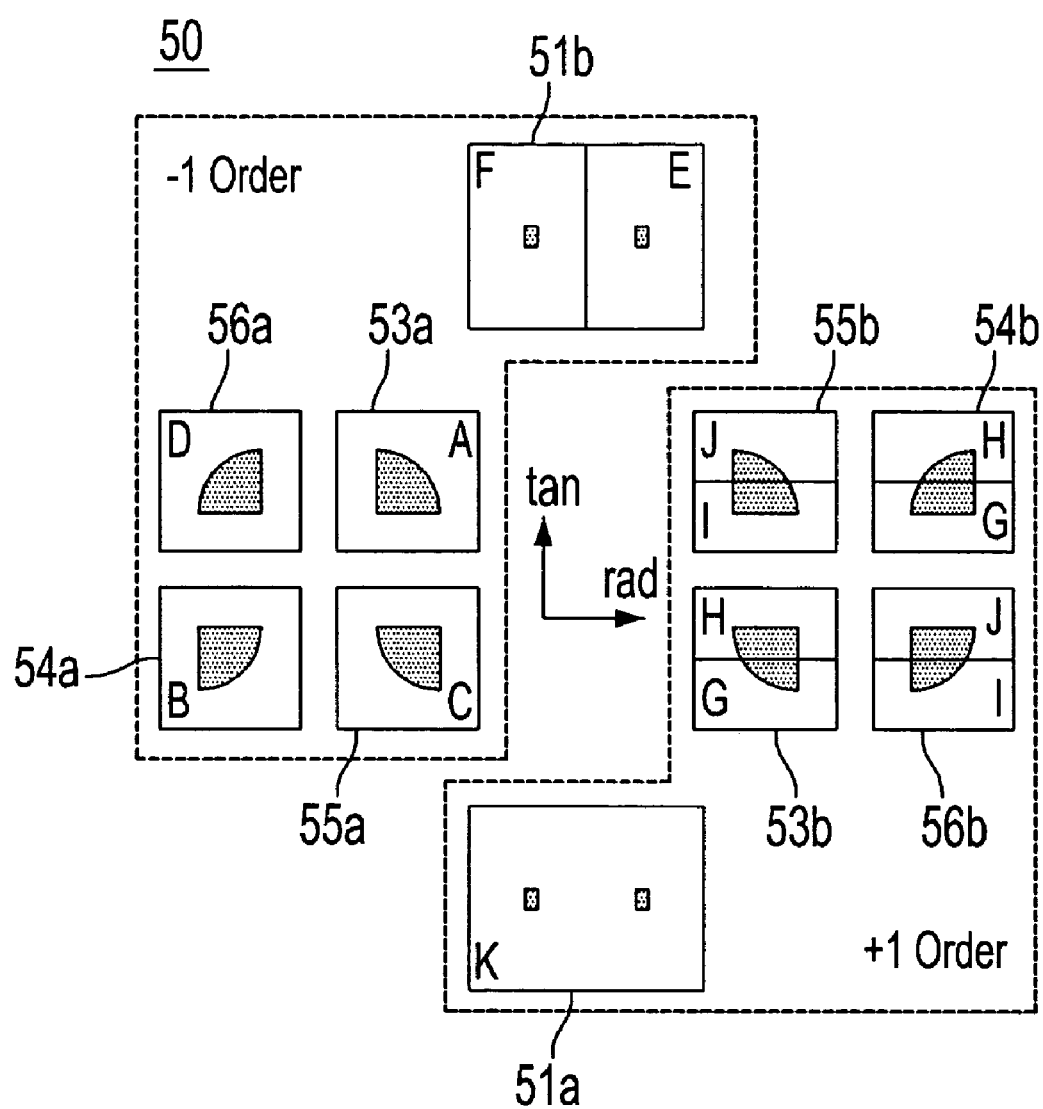
FIG. 5 is a view illustrating respective light-receiving portions of the optical pick-up apparatus of FIG. 1.

FIG. 5 illustrates the respective light-receiving portions of the photodetector 50 of FIG. 4. The photodetector 50 comprises a first bisected light-receiving portion 51b for receiving the negative first-order rays diffracted at the first and second diffraction regions E and F, a first single light-receiving portion 51a for receiving the positive first-order rays diffracted at the first and second diffraction regions E and F, third to sixth single light-receiving portions 53a, 54a, 55a, and 56a for respectively receiving the negative first-order rays diffracted at the third to sixth diffraction regions A, B, C, and D, and third to sixth bisected light-receiving portions 53b, 54b, 55b, and 56b for respectively receiving the positive first-order rays diffracted at the third to sixth diffraction regions A, B, C, and D. (Here, for convenience of description, the terms "second single light-receiving portion" and "second bisected light-receiving portion", are not used.) The first bisected light-receiving portion 51b is divided into two parts in the tangential direction of the optical disk 100, and third to sixth bisected light-receiving portions 53b, 54b, 55b, and 56b are respectively divided into two parts in the radial direction of the optical disk 100. Alphabetic marks of the respective light-receiving portions represent signals detected by the respective light-receiving portions.

Hereinafter, a method for detecting servo signals using the signals detected by the photodetector 50 will be briefly described.

A focusing error signal (FES) is detected by a cross detection method, which uses the detecting signals G, H, I, and J of the third to sixth bisected light-receiving portions 53b, 54b, 55b, and 56b, and is obtained by using Equation (1), as follows:

$$FES=(G+J)-(H+I) \qquad \text{Equation (1)}.$$

A tilting error signal (TILT) is obtained by determining the difference between signals of the regions, that have the same phase, of the third to sixth bisected light-receiving portions 53b, 54b, 55b, and 56b, which is obtained by using Equation (2), as follows:

$$TILT=(G+I)-(H+J) \qquad \text{Equation (2)}.$$

Korean Patent Laid-open Publication No. 2003-0097328discloses a method for detecting the focusing error signal and the tilting error signal and a method for detecting a regenerative signal.

A tracking error signal (TES) is detected by an advanced push-pull method. This method serves to exchange tracking servos of optical disks having different track pitches. In the advanced push-pull method, the TES is detected by the difference between a main push-pull signal (Mpp) of the detecting signals A, B, C, and D of the third to sixth single light-receiving portions 53a, 54a, 55a, and 56a and a sub push-pull signal (Spp) of the detecting signals E and F of the first bisected light-receiving portion 51b. Preferably, the sub push-pull signal (Spp) is amplified by a designated gain (k).

That is, the TES is obtained by using Equation (3), as follows:

$$TES=[Mpp]-k^*[Spp]=[(A+D)-(B+C)]-k^*[(E-F)] \qquad \text{Equation (3)}.$$

Differing from the conventional optical pick-up apparatus, the embodiments of the optical pick-up apparatus of the present invention, a diffraction region, which is extended in the tangential direction of the optical disk, out of a plurality of diffraction regions of the polarized hologram 43 is divided into first and second diffraction regions A and B.

The conventional optical pick-up apparatus interferes with the positive and negative first-order rays diffracted at a single diffraction region with a zero-order ray, thereby deteriorating the tracking signal. However, an embodiment of the optical pick-up apparatus of the present invention decreases the sizes of the rays, thereby eliminating the overlapping of the rays.

Since the rays diffracted at the first and second diffraction regions A and B forms images at separated areas of the first bisected light-receiving portion 51b, the possibility of breaking the balance of optical power between the two regions is reduced even when optical components are distorted in the operation of the optical pick-up apparatus at a high temperature. The variation of the sub push-pull signal (Spp) in the tracking servo during operations at high temperatures is prevented, thereby improving the tracking capacity during operations at high temperatures.

As apparent from the above description, the present invention provides an optical pick-up apparatus, which improves a signal regeneration capacity and a tracking capacity in operation at a high temperature.

Although an embodiment of the invention has been shown and described, it would be appreciated by those skilled in the art that changes may be made in this embodiment without departing from the principles and spirit of the invention, the scope of which is defined in the claims and their equivalents.

What is claimed is:

1. An optical pick-up apparatus comprising:
a light source;

an objective lens for focusing light emitted from the light source into an optical disk;
a hologram for splitting the light reflected by the optical disk, and diffracting rays split from the light; and
a photodetector for detecting a reproduction signal and a servo signal from the reflected rays split by the hologram,
wherein the hologram comprises first and second diffraction regions extended in the tangential direction of the optical disk, and third to sixth diffraction regions formed at both sides of the first and second diffraction regions in the radial direction of the optical disk, and
wherein the photodetector comprises
  a first bisected light-receiving portion for receiving negative first-order rays diffracted at the first and second diffraction regions,
  a first single light-receiving portion for receiving positive first-order rays diffracted at the first and second diffraction regions,
  third to sixth single light-receiving portions for respectively receiving negative first-order rays diffracted at the third to sixth diffraction regions, and
  third to sixth bisected light-receiving portions for respectively receiving positive first-order rays diffracted at the third to sixth diffraction regions.

2. The optical pick-up apparatus as set forth in claim 1, wherein the negative first-order rays diffracted at the first and second diffraction regions respectively form images at divided parts of the first bisected light-receiving portion.

3. The optical pick-up apparatus as set forth in claim 1, wherein the hologram is a polarized hologram for diffracting a designated linear polarized ray, and a quarter-wave plate is provided between the hologram and the optical disk.

4. An optical pick-up apparatus comprising:
a light source for emitting a first light to record and/or reproduce from a DVD-type optical disk;
a hologram optical module for emitting a second light to record and/or reproduce from a CD-type optical disk;
an objective lens for focusing the first and second lights onto an optical disk;
a hologram element provided with a polarized hologram for splitting and diffracting the first light reflected by the optical disk; and
a photodetector for receiving the first light split by the hologram element and detecting a regeneration signal and a servo signal,
wherein the polarized hologram includes first and second diffraction regions extended in parallel in the tangential direction of the optical disk, and third to sixth diffraction regions formed at both sides of the first and second diffraction regions,and
wherein the photodetector comprises
  a first bisected light-receiving portion for receiving negative first-order rays diffracted at the first and second diffraction regions,
  a first single light-receiving portion for receiving positive first-order rays diffracted at the first and second diffraction regions,
  third to sixth single light-receiving portions for respectively receiving negative first-order rays diffracted at the third to sixth diffraction regions, and
  third to sixth bisected light-receiving portions for respectively receiving positive first-order rays diffracted at the third to sixth diffraction regions.

5. The optical pick-up apparatus as set forth in claim 4, wherein the hologram optical modules comprise:
a second light source for emitting the second light;
a second hologram for diffracting the second light reflected by the optical disk; and
a second photodetector for detecting a signal from the second light diffracted by the second hologram.

6. The optical pick-up apparatus as set forth in claim 4, wherein the polarized hologram serves to diffract a designated linear polarized ray, and a quarter-wave plate is provided between the polarized hologram and the optical disk.

7. The optical pick-up apparatus as set forth in claim 4, wherein the lights diffracted at the first and second diffraction regions and received by the first bisected light-receiving portion and the first single light-receiving portion are decreased in size so that positive and negative first-order rays do not interfere with a zero-order ray.

8. The optical pick-up apparatus as set forth in claim 7, wherein the negative first-order rays diffracted at the first and second diffraction regions respectively form images at divided parts of the first bisected light-receiving portion.

9. An optical pick-up apparatus comprising:
a light source;
an objective lens for focusing light emitted from the light source into an optical disk;
a hologram for splitting the light reflected by the optical disk, and diffracting rays split from the light; and
a photodetector for detecting a reproduction signal and a servo signal from the reflected rays split by the hologram,
wherein the hologram comprises first and second diffraction regions extended in the tangential direction of the optical disk, and third to sixth diffraction regions formed at both sides of the first and second diffraction regions in the radial direction of the optical disk, and
wherein the hologram is a polarized hologram for diffracting a designated linear polarized ray, and a quarter-wave plate is provided between the hologram and the optical disk.

10. An optical pick-up apparatus comprising:
a light source for emitting a first light to record and/or reproduce from a DVD-type optical disk;
a hologram optical module for emitting a second light to record and/or reproduce from a CD-type optical disk;
an objective lens for focusing the first and second lights onto an optical disk;
a hologram element provided with a polarized hologram for splitting and diffracting the first light reflected by the optical disk; and
a photodetector for receiving the first light split by the hologram element and detecting a regeneration signal and a servo signal,
wherein the polarized hologram includes first and second diffraction regions extended in parallel in the tangential direction of the optical disk, and third to sixth diffraction regions formed at both sides of the first and second diffraction regions, and
wherein the polarized hologram serves to diffract a designated linear polarized ray, and a quarter-wave plate is provided between the polarized hologram and the optical disk.

* * * * *